J. F. TEMPLE.
HAY AND STOCK RACKS.

No. 181,116.                            Patented Aug. 15, 1876.

WITNESSES.  
J. Wm. Garner  
G. Walter Gibbons

INVENTOR.  
Jas. F. Temple  
per  
F. A. Lehmann, Atty

UNITED STATES PATENT OFFICE.

JAMES F. TEMPLE, OF KNAPP, WISCONSIN.

IMPROVEMENT IN HAY AND STOCK RACKS.

Specification forming part of Letters Patent No. 181,116, dated August 15, 1876; application filed June 9, 1876.

*To all whom it may concern:*

Be it known that I, JAMES F. TEMPLE, of Knapp, in the county of Dunn and State of Wisconsin, have invented certain new and useful Improvements in Hay-Racks; and I do hereby declare the following to be a full, clear, and exact description of the invention, such as will enable others skilled in the art to which it pertains to make and use it, reference being had to the accompanying drawings, which form part of this specification.

My invention relates to an improvement in hay-racks for wagons; and it consists in the arrangement and combination of parts that will be more fully described hereinafter, whereby a cheap, simple, and convenient rack is formed, which can be quickly applied to and removed from the wagon-bed.

The accompanying drawings represent my invention.

$a$ represents an ordinary wagon-bed, which may be of any size or shape desired. Extending across the top of this bed are a number of bars, $c$, each one of which has a recess or groove, $d$, cut in its under side near each end, so as to fit down over the edge of the bed, and thereby be held securely in position. Passing down through each bar, at each end, just inside of the edge of the bed, is a suitable staple or eyebolt, $e$, in which the hooks $g$, bolted to the rack, catch.

By passing the bolts $e$ through the bars just inside of the edge of the bed, some of the leverage exerted by the rack is taken off of the edge of the bed, and thrown almost entirely upon the bars.

The racks may be constructed, as here shown, of slats and uprights having beveled ends, whereby the racks lean outward, or in any other way that may be preferred. The hooks $g$ are so bent that in order to catch them in the eyes or staples $e$ the racks must be leaned far inward, thereby making it impossible for the racks to become detached while the wagon is loaded. While the racks are leaning outward they are to be used for hay and grain of all kinds. By raising the racks straight up and securing them in that position, they form a pen, in which sheep, hogs, and such animals can be transported from place to place. By inclining the racks inward so as to meet in the center, a coop is formed for fowls.

When the racks are not needed on the wagon they can be taken off and laid away in the tool-house.

Figure 1:
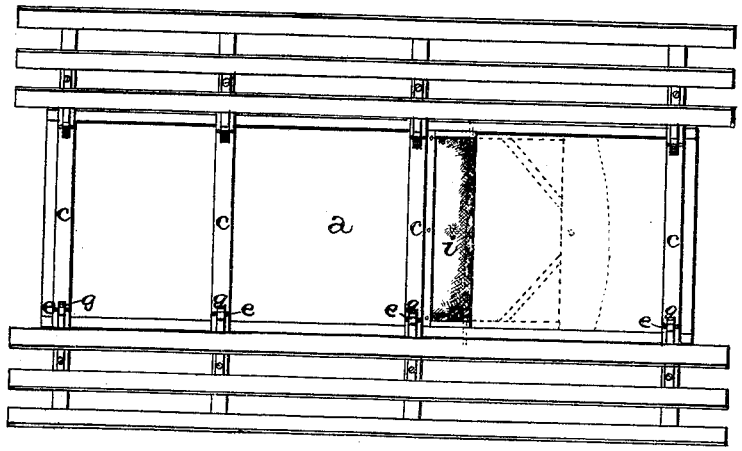
Figure 2:
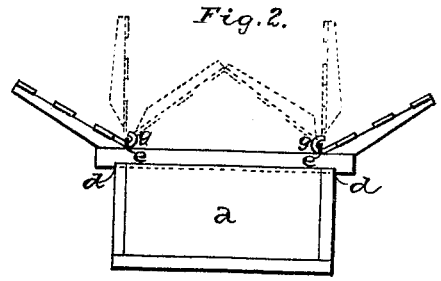

The driver's seat $i$ is pivoted in the bed, so that it can stand upright ready for use when the racks are extended, as shown in Figure 1, or can be folded down into the bed when the racks are raised.

I am aware that the racks have been hinged to the ends of the cross-bars, and this I disclaim. My invention consists in hooking them to the bars, so that they can be instantly removed, and so constructing them that they will form a chicken-coop over the top of the bed.

Having thus described my invention, I claim—

In a grain-rack, the combination of the bed $a$, cross-bars $c$, hooks or staples $e$, hooks $g$, and racks, the said racks being designed to be raised upward and inward, so as to be used in the transportation of animals, substantially as shown and described.

In testimony that I claim the foregoing I have hereunto set my hand this 15th day of May, 1876.

JAMES F. TEMPLE.

Witnesses:
   WM. P. HATHAWAY,
   J. F. CARTER.